United States Patent Office 3,654,310
Patented Apr. 4, 1972

3,654,310
ANTHRANILIC ACID DERIVATIVES
Pierre J. Queval, Sainte-Genevieve-des-Bois, and Bernard L. M. Falconnet, Le Vesinet, France, assignors to Serdex-Societe d'Etudes de Recherches de Diffusion et d'Exploitation, Levallois-Perret, France
No Drawing. Filed June 24, 1969, Ser. No. 836,132
Claims priority, application France, June 28, 1968, 157,061
Int. Cl. A61k 27/00; C07d 63/12, 63/14
U.S. Cl. 260—332.2 C
6 Claims

ABSTRACT OF THE DISCLOSURE

Anthranilic acid derivatives of formula:

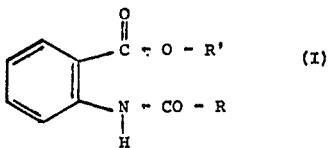

in which R is a thienyl group optionally substituted with halogen and R' is hydrogen or an alkaline-earth metal, having inflammatory, antalgic and anti-pyretic activity.

---

This invention relates to new anthranilic acid derivatives having in particular an anti-inflammatory, antalgic and anti-pyretic activity while having excellent gastric tolerance. The anthranilic acid derivatives of this invention have the formula

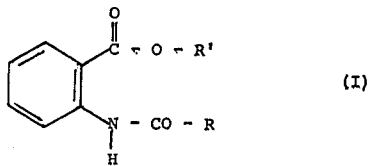

in which R is a thienyl group, optionally substituted with a halogen and R' is hydrogen or an alkaline-earth metal.

When $R^1$ is a metal, this is advantageously magnesium.

It was found that compounds (I) possess valuable therapeutical properties.

To prepare compounds (I), an anthranilic acid having the desired substituent is condensed with an acid halide of formula: R—CO—X, in which X is halogen and R has the above defined meaning.

This condensation is usually carried out in aqueous alkaline medium, with stirring, at low temperatures comprised between 10 and 20° C., for example.

The compound (I) is removed from the reaction medium, for example by acidification with hydrochloric acid and, after washing with water to pH 7.0, is then recrystallized from a suitable solvent, such as 95° ethanol.

A non limiting example is given below to illustrate the preparation of a compound (I): N-thenoyl anthranilic acid.

13.7 g. (0.1 mole) of anthranilic acid are dissolved in 150 ml. of water and 4 g. of sodium hydroxide (0.1 mole), pH=7.

With vigorous stirring, 14.6 g. (0.1 mole) of thenoyl chloride are added dropwise, while maintaining the temperature at about 13° C.

A white precipitate forms during the addition: when the medium becomes too viscous, water should be added to be able to continue stirring.

After addition of the last drop, stirring is continued for a further hour.

The reaction medium is acidified with hydrochloric acid. The resulting precipitate is suction filtered, rinsed with water to pH 7 and is then recrystallized from 95° ethanol.

Thin layer chromatography on Merck GF 254 (fluorescent) silica gel, with activation in an oven at 130° C. during 30 minutes, using as solvent water-saturated butanol +2% (by volume) 22° Bé. ammonia, and with a migration time of 4 hours, followed with drying in an oven and development with U.V. light, gives nonfluorescent violet spots and an $R_f$ value from 0.3 to 0.5 M.P. (Köfler block) is 216° C.

The compounds listed in following Table I, characterized by their melting points (Köfler block) were prepared in the same manner.

The safe character and the activity of compounds (I) are fully evidenced by toxicological and pharmacological tests the results of which are reported below.

(I) ACUTE ORAL TOXICITY IN RATS AND MICE

Acute toxicity of compounds (I) was investigated using lots of 10 male Wistar rats.

The animals were fasted the day before the test and the test material was administered orally by individual forcible feeding.

(II) ANTI-INFLAMMATORY ACTIVITY

Anti-inflammatory activity was investigated using the carragheenin-induced oedema technique.

Principle

Intraplantar injection of a carragheenin suspension induces an inflammation the extent of which is evaluated by the increase in the weight of the paw.

The test product is administered orally 1 hour prior to the carragheenin injection, and the oedema is measured 3 hours later.

The results are expressed as percent protection of the treated animals with respect to the reference animals.

An example of $ED_{50}$ of one compound (I) is given below:

Mg./kg.
N-5-chloro-2-thenoyl-anthranilic acid _____ 230

It is apparent from a comparison of the values found for the $LD_{50}$ and the $ED_{50}$ that such materials have both very low toxicity and an activity at low dosages. Therefore, with respect to the known anti-inflammatory drugs, they have the advantage of an excellent therapeutical safety margin.

Gastric tolerance test

The ulcer-producing activity was investigated in rat by the modified Bonfils method (C.R. Soc. Biol., 1957, page 1149).

An ulcer is induced in a 150 g. male rat and aggravation of the ulcer, induced by the administration of drugs, is observed.

The compounds (I) induced no substantial aggravation, while the rats treated with conventional anti-inflammatory drugs manifested signs of gastric intolerance.

Antalgic action

Antalgic activity was investigated in mice using the Sigmund test (decrease of pain reactions induced in mice by injection of phenyl benzoquinone).

The antalgic activity was outstanding, in particular with N-5-chloro-2-thenoyl-anthranilic acid.

There results from the above investigations that compounds (I) are endowed with anti-inflammatory and antalgic activity and are therapeutically useful, particularly against arthritis.

In such applications, the compounds of the invention are formulated for the oral administration to a 70 kg.

mammalian of 1–4 g. per day of active principle, the latter being combined with an excepient or vehicle suitable for such route of administration.

An example of such a formulation is given below:

| Tablets | Low dosage | Strong dosage |
|---|---|---|
| Active principle, g | 0.20 | 0.50 |
| Starch, magnesium stearate, potato starch, lactose | Q.s. to make a 1 g. tablet. | |

Having now described our invention what we claim as new and desire to secure by Letters Patent is:

1. A derivative of formula:

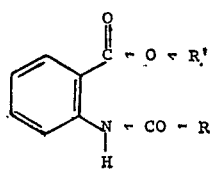

(I)

in which R is selected from the group consisting of the thienyl group and the halogen substituted thienyl groups, and R' is selected from the group consisting of hydrogen and the alkaline-earth metals.

2. A derivative as claimed in claim 1, wherein R' is magnesium.
3. N-thenoyl-anthranilic acid.
4. N-3-chloro-2-thenoyl-anthranilic acid.
5. N-5-chloro-2-thenoyl-anthranilic acid.
6. A derivative as claimed in claim 1, wherein said halogen is chlorine.

References Cited

UNITED STATES PATENTS 3,192,214  6/1965  Krapcho _____ 260—253

OTHER REFERENCES

Belg. Pat. 670751, C.A. 65: 16909 (1966).

HENRY R. JILES, Primary Examiner
C. M. SHURKO, Assistant Examiner

U.S. Cl. X.R.
424—275

UNITED STATES PATENT OFFICE
CERTIFICATE OF CORRECTION

Patent No. 3,654,310　　　　　　　　　　Dated April 4, 1972

Inventor(s) Pierre J. Queval and Bernard L. M. Falconnet

It is certified that error appears in the above-identified patent and that said Letters Patent are hereby corrected as shown below:

Column 2, between lines 14 and 15, insert the following --

TABLE I

| R | R' | Melting Point °C. |
|---|----|-------------------|
| 5-chloro-2-thienyl | H | 203 |
| 3-chloro-2-thienyl | H | 200 |

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents